May 22, 1962 G. H. LOCKWOOD ETAL 3,035,378

FEED MECHANISM

Filed Aug. 12, 1959 5 Sheets-Sheet 1

INVENTORS
George H. Lockwood
BY Albert R. Menard
Norman S. Blodgett
Attorney

May 22, 1962 G. H. LOCKWOOD ETAL 3,035,378

FEED MECHANISM

Filed Aug. 12, 1959 5 Sheets-Sheet 2

INVENTORS
George H. Lockwood
BY Albert R. Menard
Norman S. Blodgett
Attorney

May 22, 1962 G. H. LOCKWOOD ET AL 3,035,378

FEED MECHANISM

Filed Aug. 12, 1959 5 Sheets-Sheet 3

INVENTORS
George H. Lockwood
BY Albert R. Menard
Norman S. Blodgett
Attorney

FEED MECHANISM

Filed Aug. 12, 1959 5 Sheets-Sheet 4

INVENTORS
George H. Lockwood
BY Albert R. Menard
Norman S. Blodgett
Attorney

May 22, 1962 G. H. LOCKWOOD ET AL 3,035,378

FEED MECHANISM

Filed Aug. 12, 1959 5 Sheets-Sheet 5

INVENTORS
George H. Lockwood
BY Albert R. Menard
Norman S. Blodgett
Attorney 3,035,378
FEED MECHANISM
George H. Lockwood and Albert R. Menard, Worcester, Mass., assignors to The Heald Machine Company, Worcester, Mass., a corporation of Delaware
Filed Aug. 12, 1959, Ser. No. 833,204
21 Claims. (Cl. 51—165)

This invention relates to a feed mechanism and more particularly to apparatus arranged to move a material-removing tool into operative position against the work surface of a workpiece mounted in a machine tool.

In a machine tool and, more particularly, in a grinding machine of the internal type it is the usual practice to mount the feed mechanism of the machine in a box with all of the control elements in one place where they are accessible and so that the entire feed mechanism is readily replaceable. For this reason the feed box has come to represent a somewhat independent element of the machine. Furthermore, in an internal grinding machine, if it is desired to change the cycle of feeding of the abrasive wheel into the workpiece, it has been necessary to change the feed box and to provide the machine with a feed box which is made especially for that type of cycle. For the machine tool owner to change cycles, it is necessary for him to buy a new feed box, which is a less than desirable situation. With regard to the compensation portion of the cycle in which the wheel is moved toward the diamond a short distance so that the diamond will remove a small portion of the wheel on dressing, it has been impossible to adjust the compensation devices of the prior art to accomplish the compensation at any part of the cycle; the compensation has been restricted for that portion of the cycle for which the feed box was built. Furthermore, compensation elements of the past have been built in such a way that compensation takes place in increments and, in changing from one increment to another of compensation, the operator is likely to find that one setting of compensation gives too great a removal of material from the wheel so that the wheel life is short, while the next lower setting of compensation gives too small or no removal of stock from the wheel so that dressing does not take place properly. These and other difficulties experienced with the prior art devices have been obviated in a novel manner by the present invention.

It is, therefore, an outstanding object of the invention to provide a feed mechanism capable of adjustment in infinitely fine increments.

Another object of this invention is the provision of a feed mechanism for an internal grinding machine in which compensation can be arranged to take place at any part of the feeding cycle.

A further object of the present invention is the provision of a feed box having means whereby the operator can bring about retraction or rapid feed at any time despite the cycle setting and whereby, when he removes his hand from the handle, the handle will return to a neutral position, permitting the cycle to resume in the same manner that it was set before the hand operation began.

It is another object of the instant invention to provide a feed box in which a selection may be made either of constant feed which will take place during all parts of the cycle or of impulse feeding which will take place only at the ends of the longitudinal reciprocation of the wheel.

It is another object of the instant invention to provide a feed mechanism which is capable of adaption to a large number of different cycles merely by arranging the settings of the mechanism and without the necessity of taking the mechanism apart.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which:

Figure 1:
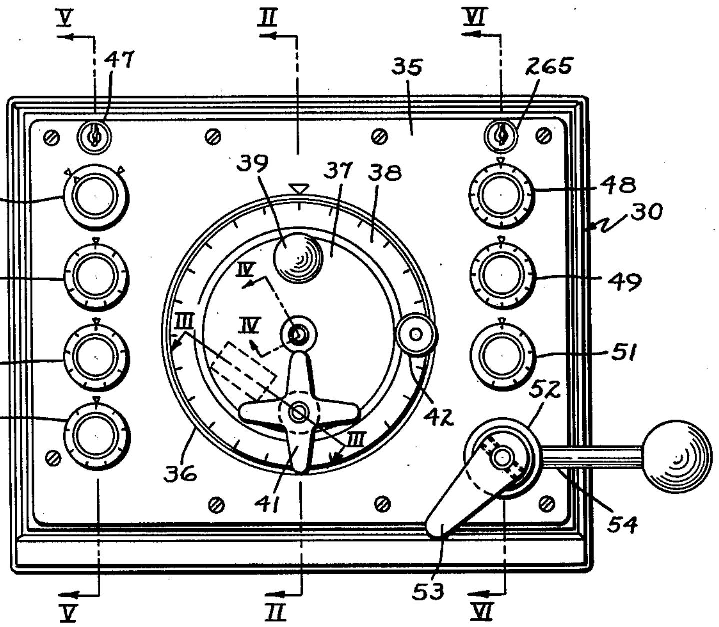
FIG. 1 is an elevational view showing the front side of a feed mechanism embodying the principles of the present invention.

Referring first to FIG. 1, wherein are best shown the general features of the invention, the feed mechanism, indicated generally by the reference numeral 30, is shown as comprising a main body 31, a top plate 32, a middle plate 33, a bottom plate 34, and a cover 35. The cover is provided in its central portion with a large circular aperture 36 in which is located a circular hub 37 and an annular dial 38. Extending from one side of the hub 37 is a handle 39 and from the same hub, but diametrically opposite the handle is a rotatable handle 41. Mounted in the annular dial 38 is a dress knob 42. Arranged in a column vertically along the left side of the cover 35 are a constant-or-impulse feed knob 43, a start of fine feed knob 44, a start of coarse feed knob 45, and a retraction knob 46. At the top of this column is a lock 47. At the right side of the cover 35 is arranged a vertical column consisting of a coarse rate knob 48, a fine rate knob 49, a compensation knob 51, and a selector knob 52. The selector knob 52 consists of an on-off handle 53 and an actuating handle 54 permitting hand operation of retraction or rapid feed.

The hub 37 is mounted on the forward end of a shaft 55, there being a key 56 and a bolt 57 for accomplishing the fastening function. The knob 41 is mounted on a short shaft 58 which extends through the hub 37 which is a relatively thin disk and, as is evident in FIG. 3, it has two grooves into one of which extends a ball detent 59 seated in a recess in the hub 37. At its outer end 58 is mounted a small gear 61 against which is pressed a plunger detent 62 which is spring biased toward the gear. The plunger 62 is mounted in a suitable bore in the hub 37 and has a coil spring seated behind it as well as a peg 63 which slides in a slot in the hub 37 and keeps the detent 62 properly aligned, the end of the detent 62 where it strikes the gear 61 being wedge-shaped to slide over the teeth of the gear.

Figure 19:
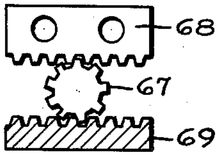
FIG. 19 is a view taken on the line XIX—XIX of FIG. 2.

The knob 42 is mounted on the outer end of a shaft 64 and the knob has an inwardly directed hub 65 which fits slidably into a bore 66 which enters the face of the dial 38 and which has a coil spring contained therein surrounding the shaft 64 which maintains the knob 42 in the outer pressed position. The shaft 64 extends through the annular dial 38 and extends from the other side where it is provided with a small gear 67 (see FIG. 19). The gear normally engages a rack 68 mounted on the back of the dial 38, but on occasion by pressure against the coil spring can engage the rack 69 mounted on a cam 71. The annular dial 38 extends inwardly through the aperture 36 in the cover 35 for a considerable distance and then is formed with a hub 72 which extends inwardly and surrounds the shaft 55. At its forward side the hub is provided with a gear 73 which is in position to be engaged by a spline 74 and at the rearward end of the shaft 58 is pressured with the handle 41. The cam 71 mentioned above is mounted at the rearward surface of the hub 72 of the dial 38 and, as has been stated, is provided with a circular rack 69 which lies in an annular groove formed in the rear of the hub of the dial 38.

Figures 5, 6, 7, 8:
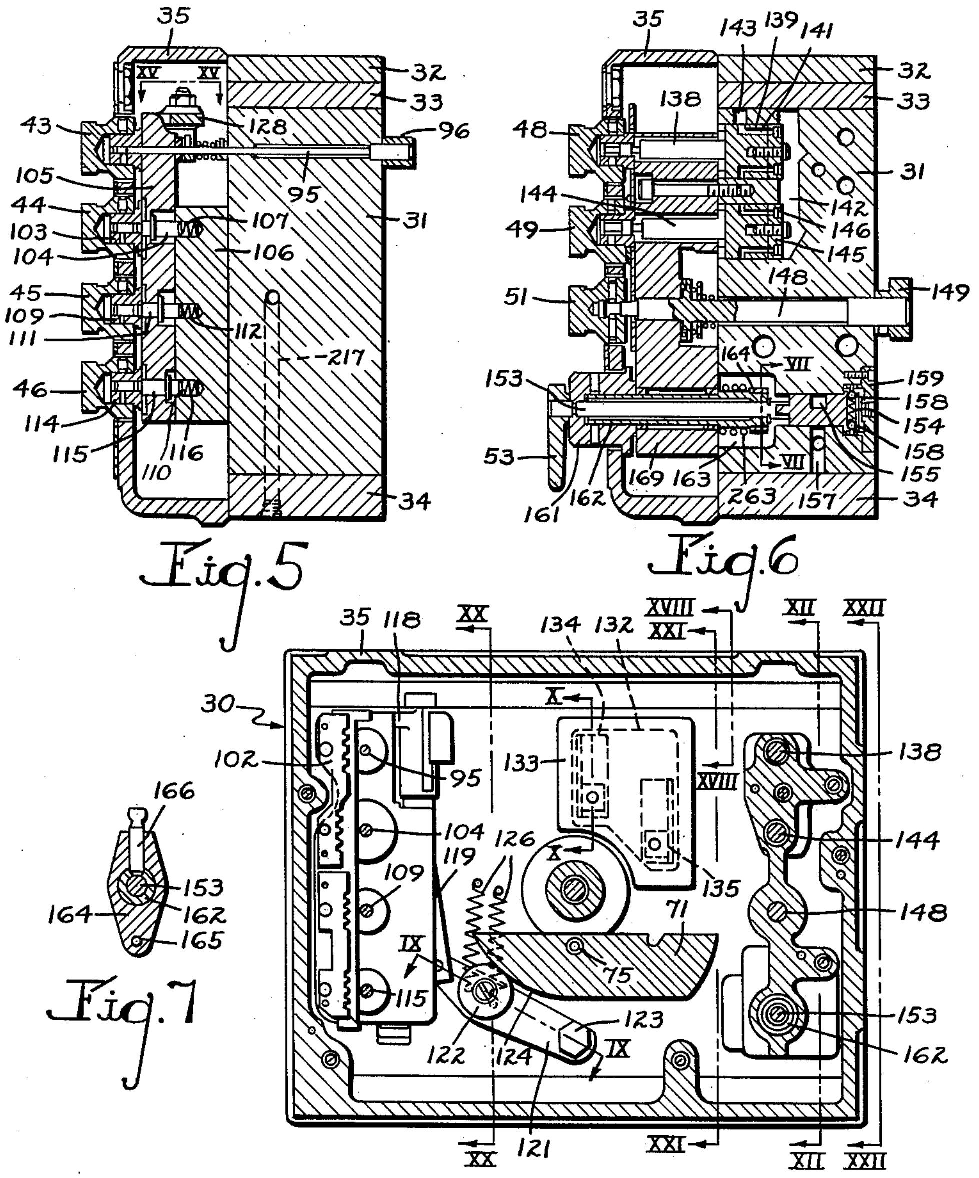
FIG. 5 is a sectional view of the invention taken on the line V—V of FIG. 1.
FIG. 6 is a sectional view of the invention taken on the line VI—VI of FIG. 1.
FIG. 7 is a sectional view of the invention taken on the line VII—VII of FIG. 6.
FIG. 8 is a sectional view of the invention taken on the line VIII—VIII of FIG. 2.

It should be noted that there is only one positive connection between the cam 71 and the hub of the dial 38 and this is by means of the pivot pin 75 which is particularly well shown in FIG. 8.

The shaft 55 extends from the hub 37 entirely through the body 31 and extends from its rearward side. It is mounted in plain bearings formed in the inner surface of a tubular shaft 76 which in turn is mounted in roller bearings 77 and 78 mounted in the body 31. A suitable lock washer and lock nut assembly 79 is mounted on the tubular shaft 76 immediately against the forward side of the body 31; a lock washer 81 performs the same function at the rearward side of the body 31. In its intermediate portion the tubular shaft 76 is provided with a gear 82 which engages a rack (not shown) formed on the side of a piston 84 which is vertically slidable in the body 31 as is evident in FIG. 20. The forward end of the tubular shaft 76 extends past the cam 71 and is bolted to the hub 72 of the annular dial 38. At its rearward end where it extends from the body 31 the shaft 55 has rotatably mounted on it a drum member 85 on which is fastened an internal gear ring 86 which is particularly well shown in FIG. 11. Internal gear ring 86 engages a series of planetary gears 87 which are pivotally attached to a pinion gear 88. It should be noted at this point that the pinion gear 88 is adapted to be attached directly or through gearing to the feed screw of a conventional grinding machine and it is motion of this gear which brings about feed motion of the machine.

Figure 11:
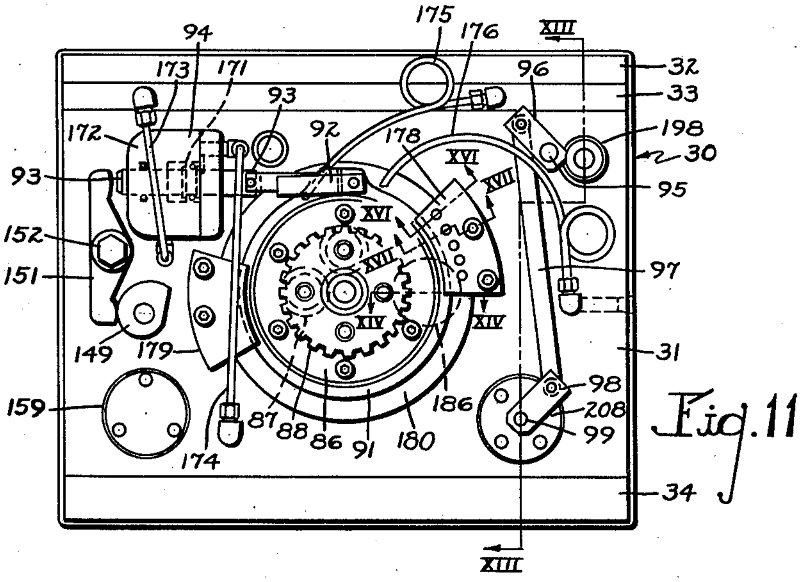
FIG. 11 is an elevational view of the feed box of the invention taken from the rear thereof.

The drum member 85 is formed with a smooth cylindrical outer surface 89 and along this surface is located a friction ring 91. The friction ring 91 is made up of two split rings connected end to end to form a spiral that passes completely around the cylindrical surface almost twice. Each one of the split rings is formed mathematically so that when the slightly separated ends are brought together the friction force brought to bear against the cylindrical surface is equal around the cylinder. The width of the ring is mathematically calculated in a manner well known in the art, but in general is thicker intermediate the ends than it is adjacent the ends forming the split. One free end of the ring is fastened to one end of an actuating block 92 which, as is evident in FIG. 11, is attached at its outer end to the piston rod 93 of a hydraulic linear actuator 94. As is obvious in FIG. 11, the free ends of the rings are provided with a wide section permitting ready fastening to the actuating block 92. The other end of the ring is free.

Figure 2:
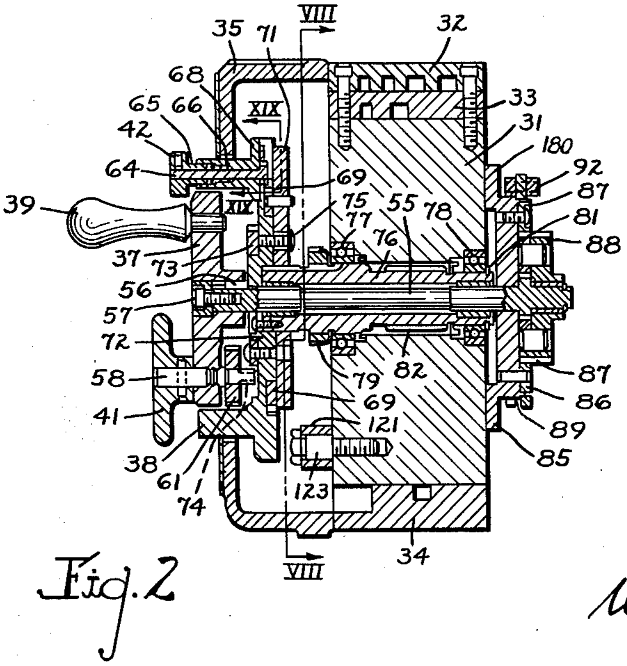
FIG. 2 is a sectional view of the invention taken on the line II—II of FIG. 1.
Figure 4:
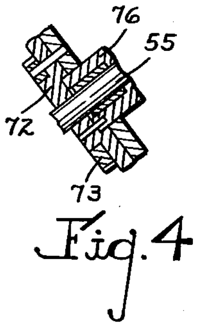
FIG. 4 is a sectional view of the invention taken on the line IV—IV of FIG. 1.

As is quite evident in FIG. 2 as well as other views of the drawings, the top plate 32, the middle plate 33, the body 31, and the bottom plate 34 are bolted together to form a unitary assemblage, the way having been made in the manner shown only to provide ease in machining the oil passages and so on. FIG. 4 shows particularly well the manner in which the gear 73 is fastened to the forward side of the hub 72 of the annular dial 38 and the manner in which the shaft 55 extends through the two of them while the tubular shaft 76 is fastened to them.

FIG. 5 of the drawings is a vertical view through the left hand column of knobs. It can be seen that the constant-or-impulse feed knob 43 is connected to a shaft 95 which extends further back of the body 31 and has keyed thereto a crank arm 96. As is evident in FIG. 11, the other end of the crank arm 96 is attached to the upper end of a connecting rod 97, the bottom end of which is attached to one end of a crank arm 98. The other end of the crank arm 98 is keyed to a rotatable body 99 of a valve 101, shown particularly well in FIG. 13 which will be described more fully hereinafter.

The start fine feed knob 44, the start coarse feed knob 45, and the retraction knob 46 are all engaged by a rack member 102 best shown in FIG. 8 which has a small rack segment meshing with a spline on each of the knobs and associated with the lock 47 to prevent the rotation of the knobs unless the lock is released. Each of the knobs 44, 45 and 46 is biased outwardly by a spring and when in the normal outwardly pressed position has a spline which engages one of the small racks formed on the rack member 102. When pressed inwardly a gear on the knob engages a rack formed on its own cam and by rotation of the knob the cam can be moved vertically. Since the knob 44 is provided with an inner knob 103 which in turn is mounted on a stub shaft 104 mounted in a bracket plate 105 which is attached to the main body 31 by means of a block 106. The block 106 is provided with a recess 107 in which the rearward end of the stub shaft 104 lies and which also contains a coil spring for biasing the shaft forwardly. When the knob 44 is pressed inwardly against the coil spring a gear on the inner knob 103 engages the rack (not shown) on a fine feed cam 108 (for which see FIG. 15). In the same way the knob 45 is provided with an inner knob 109 which is mounted on a stub shaft 111 whose rearward end resides in a bore 112 formed in the block 106, the shaft 111 being biased outwardly or forwardly of the bore 112 by a coil spring. But, when the knob 45 is pressed inwardly, a gear (not shown) on the knob 109 engages a rack on a coarse feed cam 113. The knob 46 is mounted on an inner knob 114 having a stub shaft 115 extending through the bracket plate 105 and having its rear end residing in a bore 116 in the block 106, there being a coil spring 110 which biases the stub shaft and the knob elements forwardly. When the knob 46 is pressed inwardly a gear on the inner knob 114 engages a rack (not shown) on a retraction cam 117. As is evident in FIG. 15 the three cams 108, 113 and 117 are plate-like and lie side by side in planes parallel to the front of the feed box.

Figure 9:
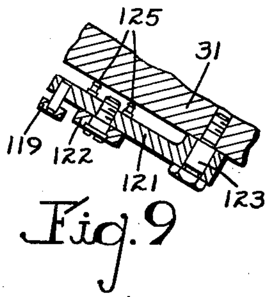
FIG. 9 is a sectional view of the invention taken on the line IX—IX of FIG. 8.
Figure 15:
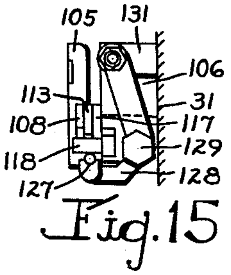
FIG. 15 is a sectional view of the invention taken on the line XV—XV of FIG. 5.

Referring now to FIGS. 8 and 15, it can be seen that the cams are engaged by a tungsten carbide rod-like follower 118 which is mounted at the upper end of a lever 119. At its lower end the lever 119 is pivotally attached to a follower arm 121 having a cam follower 122 pivotally and rotatably mounted on the intermediate portion of the arm. The end of the arm 121 which is not attached to the lever 119 is pivotally attached to the body 31 by means of a pivot bolt 123, the arm and bolt also being shown particularly well in FIG. 2. The cam follower 122 falls against the configurated surface 124 of the cam 71 which it will be recalled is attached to the rearward surface of the annular dial 38 by means of the pivot pin 75. FIG. 9, which is a sectional view through the arm 121, shows the elements particularly well. It shows pins 125 extending from the back of the arm which are attached by coil springs 126 to similar pins extending from the main body 31, the arm 121 being biased against the surface 124 by these springs at all times. Referring again to FIG. 15, it can be seen that the follower 118 is engaged by a carbide pin 127 mounted at one end of a bell crank 128. The bell crank is pivoted at its intermediate portion by means of a pivot pin 129 to the upper surface of the bracket plate 105, and at its other end is attached to an extending outer end of a plunger 131, which protrudes from the main body 31 and forms part of a sequence valve which will be described more fully hereinafter.

Referring to FIG. 8, it can be seen that the main body 31 is provided with a recess 132 which is normally closed by a cover 133. Within the recess are mounted two microswitches, a finish microswitch 134 and a dress microswitch 135. The finish microswitch is particularly well shown in FIG. 10. It can be seen that a spring-loaded plunger 136 is mounted on the cover 133 in position to engage the contact arm of the microswitch 134 and also to be engaged by a cam 137 mounted on the rear surface of the hub 72 of the annular dial 38. A similar spring-loaded plunger and cam is provided for the dress microswitch 135.

Referring now to FIG. 6, the coarse rate knob 48 is attached by a shaft 138 to an orifice member 139. This orifice member is rotatably mounted in a bore in the main body 31 and is of generally right circular cylindrical form; by rotating the knob 48 any one of the orifice passages 141 may be connected between a pressure oil chamber 142 and a passage 143. Similarly, the fine rate knob 49 is attached by a shaft 144 to an orifice member 145 having a series of orifice passages 146. By rotation of the knob 49 any one of the orifice passages 146 may be used to connect the pressure oil chamber 142 to a passage 147 shown in FIG. 23. The compensation knob 51 is mounted at the forward end of a long shaft 148 which extends through the block 106 and the main body 31 and at its rearward side, where it extends from the back side of the body 31, it has attached thereto a cam 149 which is best shown in FIG. 11. The cam engages a rocker arm 151 which is pivotally attached by a pivot pin 152 in its central portion to the main body 31. At its upper end the rocker arm 151 engages the piston rod 93 as it extends to the left from the hydraulic linear actuator 94. In connection with FIG. 6 it should be noted that a coil spring 263 surrounds the tubular shaft 162 between the block 169 and the crank arm 164; the coil spring is fastened on one end to the block 169 and on the other end to the shaft 162 so that when the actuating handle associated with the knob 161 is released, it will return to an intermediate neutral position producing neither retraction nor rapid feed.

Figure 21:
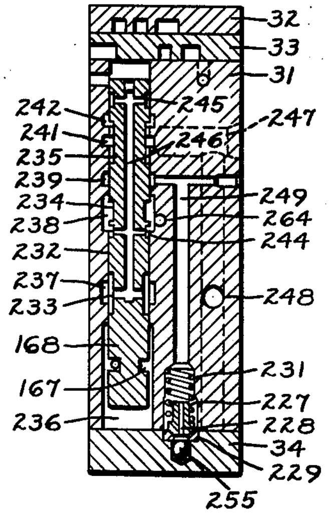
FIG. 21 is a sectional view taken on the line XXI—XXI of FIG. 8.
Figure 23:
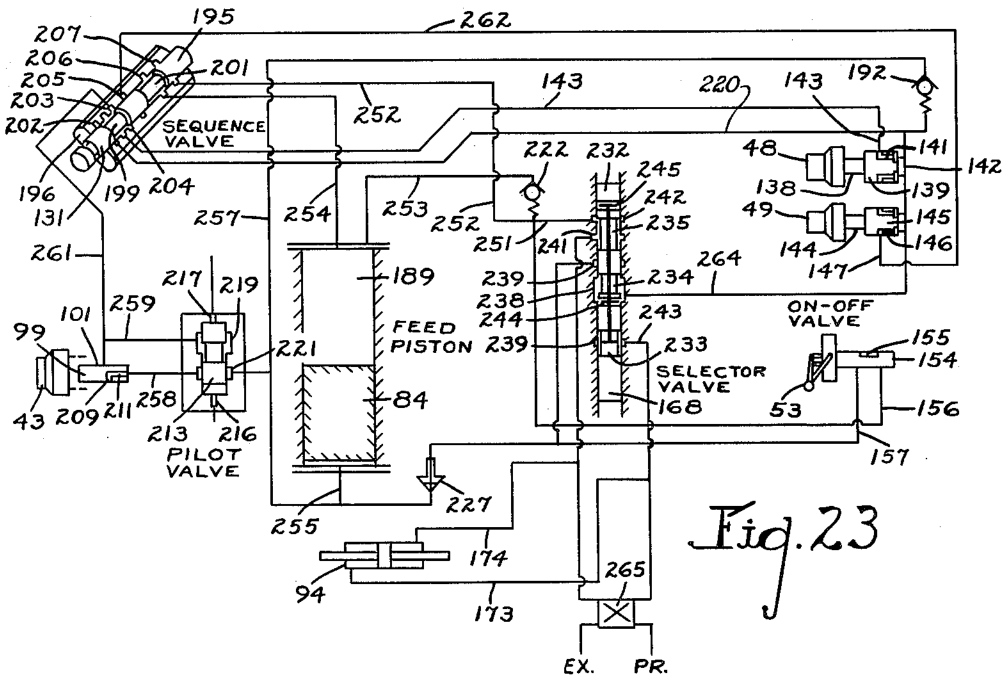
FIG. 23 is a schemmatic view of the hydraulic system of the feed mechanism.

Now, with regard to the selected knob 52, the on-off handle 53 is mounted on a shaft 153 which extends through the block 106 and engages a rotatable valve element 154 having a partial groove 155 formed therein which may, on occasion, by rotation of the handle 53 join a passage 156 to a passage 157, the latter passage being shown in FIG. 23. At its back end the valve element 154 is provided with spring-loaded ball detents 158 which engage recesses formed in a cover member 159 recessed in the back of the body 31. This cover member is circular and may also be seen in FIG. 11. The actuating handle 54 extends outwardly from a knob 161 which is suitably mounted in the cover 35 and extends over and is fastened to a tubular shaft 162 which extends through the block 106 into a recess 163 formed in the forward side of the main body 31. In FIG. 7 it can be seen that the tubular shaft 162 surrounds and acts as a support for the shaft 153 associated with the on-off handle 53. Now, on the portion of the tubular shaft 162 which resides within the recess 163 is a crank arm 164 having at one end a dowel pin 165 for limiting motion of the crank arm and at the other end a pin 166 which extends at a right angle to the axis of the tubular shaft 162 and is provided at its outer end with a ball. This ball resides in a groove 167 formed in the lower end of a plunger 168 associated with a selector valve which will be described more fully hereinafter, but which is shown in FIG. 21. It should be noted that a separate block 169 is mounted on the front of the main body 31 to accommodate the shaft associated with the knobs 48, 49, 51, and the handle 53.

Referring now to FIG. 11, it can be seen that most of the elements shown therein have been described somewhat in the portion of the description set forth hereinbefore. It should be noted, however, that the hydraulic linear actuator 94 is provided with a piston 171 mounted on the piston rod 93, the piston being slidable in the bore of a cylinder 172. One end of the cylinder is connected by a conduit 173 to a passage in the middle plate 33 and the other end of the cylinder is connected by a conduit 174 to another passage in the body 31. FIG. 11 also shows lubricating conduits 175 and 176 associated with the friction ring 91. A certain amount of lubrication is necessary to insure smooth and consistent gripping of the drum member 85.

Figure 14:
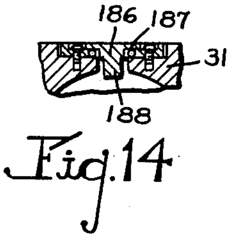
FIG. 14 is a sectional view of the invention taken on the line XIV—XIV of FIG. 11.
Figure 16:
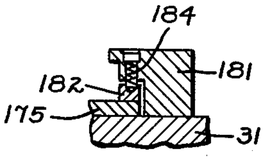
FIG. 16 is a sectional view of the invention taken on the line XVI—XVI of FIG. 11.
Figure 17:
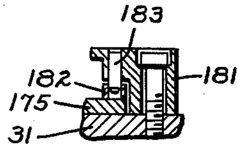
FIG. 17 is a sectional view of the invention taken on the line XVII—XVII of FIG. 11.

In order to prevent undue vibration or movement of the drum member 85, it is provided with a wide flange 180 which is engaged by two friction assemblies 178 and 179. The friction assembly 178 is shown in some detail in FIGS. 16 and 17. It consists of a main plate 181 which is bolted to the main body 31. It is L-shaped in cross section with one arm overlying the flange 175 of the drum member. Between the overhanging portion of the main plate 181 and the flange 180 is interposed a bronze friction ring 182. There are two dowels 183 extending from the main body 181 into a loose fitting recess in the friction ring 182 to keep the friction ring in place, as is shown in FIG. 17. As is shown in FIG. 16, a coil spring 184 also extends between the main plate 181 and the friction ring 182. A suitable threaded set screw can be used to adjust the tension of the coil spring 184 and maintain the proper friction between the friction plate 182 and the flange 175 as is desired. Lying behind the drum member 85 and accessible only by removal thereof, is a key member 186 which is particularly well shown in FIGS. 14 and 20. It can be seen that the key member 186 consists of a circular cover plate 187 and a key 188 which extends into a bore 189 extending vertically through the main body 31. It can be seen that the key 188 extends into a keyway 191 formed in the side of the piston 84 which it will be recalled has a rack by which it drives the tubular shaft 76 described in connection with FIG. 2.

Figure 12:
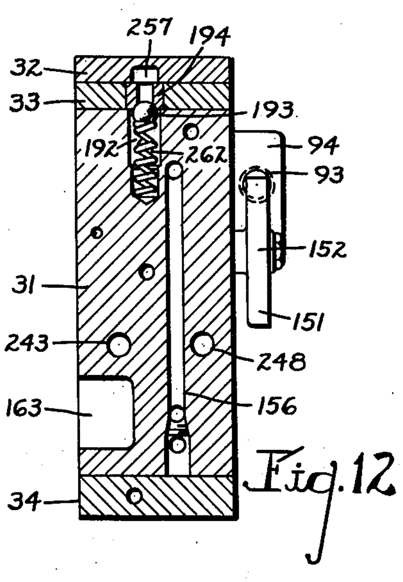
FIG. 12 is a sectional view of the invention taken on the line XII—XII of FIG. 8.

FIG. 12 shows the manner in which the rocker arm 151 is mouinted by means of the pivot pin 152 on the rear surface of the main body 31. At the upper part of this view can be seen a check valve 192 having a ball 193 seated against a hardened metal insert 194 in the middle plate 33. The position of this check valve in the hydraulic system is shown in FIG. 23.

Figure 13:
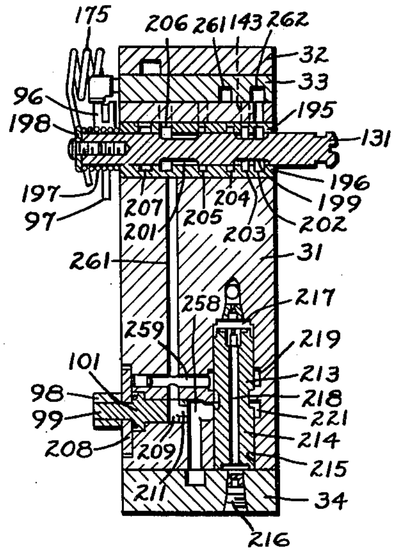
FIG. 13 is a sectional view of the invention taken on the line XIII—XIII of FIG. 11.

In FIG. 13 is shown the details of the plunger 131 which, as has been stated before, is attached to the crank arm 128 and forms a part of a sequence valve 195. The plunger is slidable in a sleeve 196 which in turn is mounted in the main body 31. The plunger 131 extends through the rear of the body 31 and is provided with a coil spring 197 which is compressed between the end of the sleeve 196 and a disk 198 bolted to the end of the plunger. It will be understood that the spring 197 will tend to keep the plunger 131 drawn rearwardly from the sleeve 196 and this will cause the carbide dowel 127 mounted on the end of the bell crank 128 to press tightly against the cam follower 118 at all times so that the shape of the cams 108, 113, and 117 will be followed closely by the cam follower 118. The plunger 131 is formed with two elongated grooves 199 and 201. The sleeve, on the other hand, is provided with six grooves 202, 203, 204, 205, 206, and 207. The relationship between the grooves 199 and 201 on the plunger 131 and the grooves 202 through 207 on the sleeve 196 will be understood more fully in connection with the description of the operation of the device. In the lower part of the main body 31 is located the valve 101 which is actuated by the rotation of the knob 43. The rotatable body 99 of the valve is retained in place by a circular plate 208 embedded in the rear surface of the main body 31. At the end of the rotatable body 99 is a transverse passage 209 which is joined to an axial passage 211 extending from the transverse passage to the forward end of the rotatable body. Located beside the valve 101 is a pilot valve 213 consisting of a piston 214 slidably mounted in a vertical bore 215 formed in the main body 31. An input port 216 extends through the bottom plate 34 and an output port 217 opens at the upper end of the bore above the piston. The piston is provided with a central bore 218 and the bore is provided with two grooves 219 and 221 located below and above, respectively, the central portion of the bore.

Figure 18:
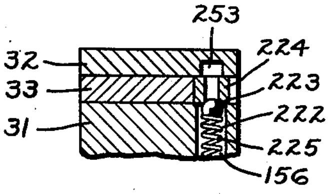
FIG. 18 is a sectional view taken on the line XVIII—XVIII of FIG. 8.

FIG. 18 shows the location of construction of a check valve 222 which is provided with a ball 223 which is pressed against a hardened metal insert 224 seated in a bore in the middle plate 33, the ball being pressed against the insert by a coil spring 225.

Figure 20:
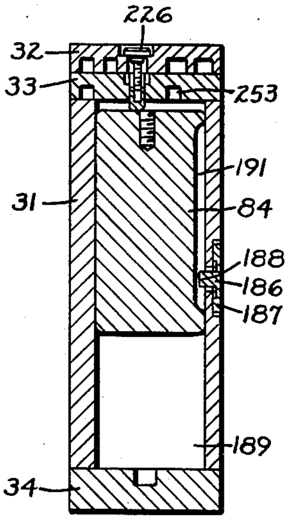
FIG. 20 is a sectional view taken on the line XX—XX of FIG. 8.

In connection with FIG. 20, the subject matter of which has been rather thoroughly described elsewhere in this description, it should be noted that an adjustable stop 226 extends through the top plate 32 and the middle plate 33 over the top of the bore 189 in position to be engaged by the top of the piston 84 and to limit its vertical motion.

In FIG. 21 is shown an orifice assembly 227 wherein a plug 228 having a fine axial orifice is held against a hard metal insert 229 mounted in a bore in the bottom plate 34, the plug being urged against the insert by a coil spring 231. Also shown in this figure is the plunger 168 which forms a part of a selective valve 232. The plunger 168 is provided with three grooves 233, 234 and 235. It is slidable in a vertical bore 236 extending entirely through the body 31. The bore is provided with five grooves 237, 238, 239, 241 and 242.

Figure 22:
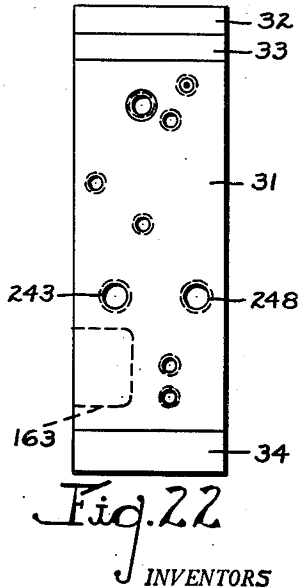
FIG. 22 is a view of the side of the feed box taken along the line XXII—XII of FIG. 8.

The connection between the various elements of the feed mechanism has been purposely omitted from the descriptions of the various figures of the drawings because it is best taken up in connection with the schematic hydraulic circuit shown in FIG. 23. A passage 243 enters the side of the main body, as is evident in FIG. 22, and connects to the groove 237 associated with the bore 236. With the plunger 168 in the condition shown in FIG. 21, therefore, pressure is felt in the groove 233 of the plunger. The groove 233 is directly connected through the plunger with a groove 244 and with a groove 245 by a long axial passage 246 connected with the grooves by radial bores. The groove 233 is elongated in the direction of the length of the plunger in such a manner that it always has access to the groove 237 in the bore and, therefore, pressure oil always appears in the passage 243 and at the grooves 244 and 245. The groove 241 is connected by a passage 247 to an exhaust port 248 shown in FIG. 22. The pressure port 243 and the exhaust port 248 are connected to a source of hydraulic pressure and a sump (not shown) in the usual manner. The groove 239 is connected by a passage 249 to one side of the orifice assembly 227 and also by a passage 157 to one side of the on-off rotatable valve element 154. The other side of the valve element is connected by a passage 156 to the spring side of the check valve 222. The spring side of the check valve 222 is also connected to the groove 242 of the plunger 168 by a passage 251. The spring side of the check valve 222 is also connected by a passage 252 to the groove 207 of the sequence valve 195. The other side of the check valve 222 is connected by a passage 253 to the upper end of the bore 189 over the piston 84. This same end of the bore 189 is connected by a passage 254 to the groove 206 of the sequence valve 195. The bottom end of the bore 189 is connected by a passage 255 to the non-spring side of the orifice assembly 227. It is also connected by a passage to the groove 221 of the pilot valve 213. An intermediate portion of the passage is connected by a passage 257 to the non-spring side of the check valve 192. The spring side of the valve 192 is connected by a line 220 to the groove 202. The groove 221 of the pivot valve 213 is also connected by a short passage 258 to the axial passage 211 in the rotary valve body 99. A transverse passage 209 in the body 99 is connected by a short passage 259 to the groove 219 of the pilot valve 213. The passage 209 in the body 99 is also connected by a passage 261, shown in FIG. 13, to the groove 204 of the sequence valve 195. The groove 202 of the sequence valve is connected by a passage 262 to the spring side of the check valve 192, as is shown in FIG. 12. The spring side of the check valve 192 is also connected to the pressure oil chamber 142 beside the feed rate throttle. The orifice 141 of the orifice member 139 associated with the coarse rate knob 48 is connected by a passage 143 to the groove 203 of the sequence valve 195. The groove 205 of the sequence valve is connected by a passage 262 to the operative orifice 146 of the orifice member 145 associated with the fine rate knob 49. Referring to FIG. 21, it will be seen that the groove 238 associated with the selector valve 232 is connected by a passage 264 to the pressure oil chamber 142.

The operation of the invention will now be readily understood in view of the above description. The feed mechanism of the invention is incorporated in an automatic feed box with constant or impulse feed, which is hydraulically operated. One large hydraulic piston inside the box is controlled by microswitches for dress and for final termination of the grinding operation. The apparatus is provided with fine, coarse and retraction cams and with knobs and locks for setting these cams. Fine and coarse throttles are provided for regulating the hydraulic feed of oil to the main feed cylinder. A unidirectional drive, clutch, and planetary gears are used for infinitely variable compensation, and a selector valve is provided for bringing about manual retraction or rapid feed. Furthermore, compensation can also take place by hand.

The knob 43 located in the upper left hand corner of the box is attached to the hub of the inner knob or lock gear and a coil spring holds the gear in the outward position so that it meshes with the mating teeth on the rack member 102. Therefore, the knob must be pushed in against the spring to release the lock gear from the rack member before it can be turned to determine whether the feed will be constant or by impulse actuation. When the knob is turned it turns the shaft 95 which works through the crank arm 96, the link 97, and the crank arm 98 to turn the valve body 99, thereby determining whether feed oil will be directed through the pilot valve 213 for impulse feed, or will by-pass the valve for constant feed.

The start fine feed knob 44, the start coarse feed knob 45, and the start retraction knob 46 are located on the left hand side of the box directly under the knob 43. Each knob is attached to the hub of a lock pinion or inner knob 103, 109, and 114, respectively. Each of these inner hubs or lock pinions is attached to the stub of another gear. Furthermore, each pinion meshes with the rack teeth on the side of the fine, coarse and retraction cam to which it relates and which it is intended to adjust. Coil springs hold the inner hubs in the outward direction so that they are meshed with the main teeth in the rack member 102. Therefore, the knobs must be pushed in against the spring to release the inner knobs from the lock rack member 102 before they can be turned to regulate the positions of their respective cams. When the knobs are turned they raise or lower the cams which in turn regulate the path of the cam follower 118, thereby determining when the sequence valve 195 changes from rapid advance position to coarse feed position, from coarse feed position to fine feed position, and from fine feed position to retraction position. If the lock 47 is locked, it interferes with the movement of the four knobs when one attempts to push them inwardly and therefore change in the knob settings cannot take place. When the lock is unlocked, however, a spring pulls the lock bar up so that it will not interfere with the pressure on the knobs and they can be moved inwardly.

A dress knob 42 is located on the annular dial 38 and it also must be pressed inwardly before it can be turned. The knob is attached to the hub of the gear 67; this gear meshes with the gear 69 and also with the rack 68. Pushing the knob 42 inwardly compresses the coil spring 66 around the gear 67 to dis-engage from the lock 68, thereby allowing the gear 69 to be turned to position the cam 137 which is to contact the dress microswitch 135. This microswitch operates in the usual way to cause the wheelhead to move on an extended traverse for contact of the abrasive wheel with the dressing diamond.

The coarse and fine feed throttles are controlled by the knobs 48 and 49 on the right hand side of the box and, as has been described above, are connected to throttles or orifice members 139 and 145, respectively. Each orifice member is formed as a barrel having 12 orifices, each of a different diameter. When the knob is turned, one orifice is open to permit oil to pass through and be metered before it goes to a groove in the sequence valve 195. If the lock 265 at the top of this column is locked, a lock bar interferes with ratchet teeth on the inner knobs so that the throttle knobs cannot be turned. When it is unlocked, the lock bar rides over the ratchet teeth and no problem is encountered in adjusting the orifice members.

Figure 24:
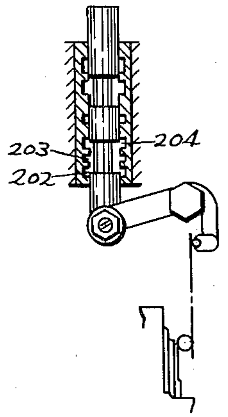
FIGS. 24 through 27 show the condition of a sequence valve during various parts of the cycle.
Figure 25:
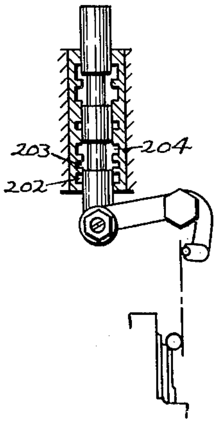
Figure 26:
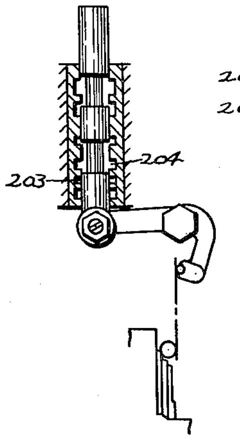
Figure 27:
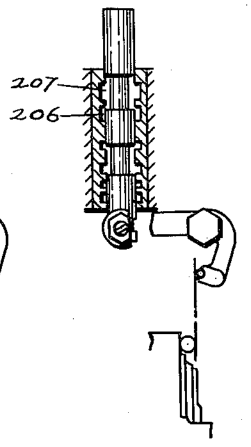

The sequence valve 195 is formed so that the plunger 131 moves during the feed cycle and distributes the oil from the selector valve or throttles to one end or the other of the feed piston 84 at the proper time in the feed cycle. As the central wheel or hub 37 and the annular dial member 38 turn toward a zero point, the cam 71 on the hub bears on the rotary follower 122 on the follower arm 121 causing the lever 119 to rise so that the follower 118 rides upon the cams 108, 113, and 117. As the position of the lever changes, due to the cams, the arm 128 turns because of the pin 127 riding against the follower 118. The arm, of course, is connected to the plunger 131 of the sequence valve causing it to change position, the various positions being controlled by cams. When the follower 127 first starts along the retracting cam 117, the plunger 131 is in the condition shown in FIG. 24, but rapid advance takes place, since, when the selector valve handle 54 is in a neutral position and the handle 53 is at "on," pressure oil from the groove 239 in the selector valve by-passes the throttles and goes directly through the grooves 202 and 204 in the sequence valve 195 to the feed piston 84. In FIG. 25 the groove 202 is closed so oil from the coarse throttle 139 goes to the main feed piston 84. At the position shown in FIG. 26 the groove 203 is closed so metered oil from the fine throttle 145 goes to the feed piston. When finish contact occurs by the cam 137 contacting the plunger 136 to close the microswitch 134, the pressure shifts from the groove 239 at the selector valve to the groove 241 because of the switching of the exhaust and pressure lines by a conventional reversing valve 265 in the grinding machine. When the oil goes through the grooves 206 and 207 of the sequence valve to the opposite end of the feed piston 84, the reverse feed serves to retract the pin 127 associated with the arm 128 so that it returns along the cams until the groove 207 is closed. Then, retraction ceases and the annular dial on the front of the box should be at the same setting as that to which the retraction knob has been set.

The knob 51 under the coarse and fine rate feed knobs is used for setting the amount of compensation for wheel wear between pieces being ground, the amount removed from the wheel by the dressing operation also being such as to produce a good dress of the wheel. The knob is held in an outward direction by a coil spring surrounding the shaft 148 and, therefore, must be pushed inwardly to turn. The coil spring also holds the shaft for a thrust bearing creating friction on the block 169 and preventing the knob from turning due to vibrations and so forth. The shaft is, of course, fastened to the cam 149 and turning the knob causes the cam to rotate, thereby positioning the rocker arm 151 which limits travel of the piston rod 93 of the hydraulic linear actuator 94. This, therefore, determines the amount of compensation. As the piston rod 93 moves to the left, as shown in FIG. 11, within its cylinder, it pulls the actuating block 92 which pulls on the right hand ear of the split friction ring 91 causing it to contract on the drum member 85 and turn the drum member counterclockwise (when viewed from the rear of the feed box). The internal gear 86 which is fastened to the drum also rotates; this in turn meshes with the four planetary gears 87 and the pivotal axes of these gears are fixed to the driven gear pinion 88. Therefore, as the cam member and the internal gear turn, they cause the planetary gears to turn around the sun gear which is held stationary by the feed piston 84 which is at the limit of its stroke. This then causes the driven gear to turn also, producing feed of the wheelhead slide transversely of the grinding machine. When the reversing valve 265 reverses the exhaust and pressure lines, pressure oil appears at the left side of the actuator 94, moving the piston to the right and pushing through the block 92 allowing the split ring 91 to relax and slip on the drum member 85, thereby resetting the ring without moving the drum member. The spring-loaded shoes or friction assemblies 178 and 179 are provided to create a drag on the drum member to hold it stationary while the split ring is resetting. Oil for operating the compensation cylinder or actuator 94 is normally taken from the ordinary oil lines entering the feed box. However, it can, if required, be operated by an external solenoid valve for compensation at any point in the cycle or for skip compensation.

Figure 10:
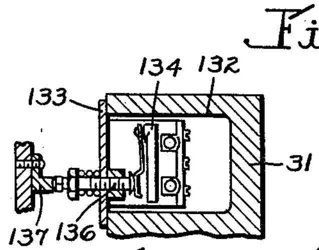
FIG. 10 is a sectional view of the invention taken on the line X—X of FIG. 8.

The microswitches 134 and 135 are used, respectively, for dress and final contact. These switches are hermetically sealed to exclude dirt, oil, and so on and to retain an inert gas with which they are filled. This gas prevents pitting of the contacts because of arcing, thus introducing a more accurate sizing with less frequent adjusting and servicing. These switches are mounted in the cored cavity 132 in the main body 31. The cavity or recess 132 is closed with a gasketed cover 133 to prevent oil and dirt from reaching the switches. As the annular dial 38 turns toward a zero point, a pin extending through a slot in the cam 71 strikes the actuating pin of the dress microswitch 135 and brings about dress in the manner described above. The cam 137 which is mounted at the rear of the feed cam 71 operates the final switch 134 by striking the plunger 136 as shown in FIG. 10, and bringing about retraction.

The selector handle 54, which is located on the lower right hand corner of the feed box, is spring loaded by the torsion spring 263 to hold it in a central or neutral position. The handle and its knob 161 are connected to the shaft 162 which connects the link or lever 164 to the valve plunger 168 of the selector valve 232. Pulling the plunger up and down will determine whether the pressure oil is directed to the top or bottom of the feed piston 84 to provide either rapid feed or retraction. Moving the handle 54 in a downward direction will connect passages inside of the main body and core plates to by-pass the metering throttles, to pass through the sequence valve, and to provide oil directly to the bottom of the feed cylinder, resulting in a rapid infeed. When the lever is released, it will automatically return to the neutral position, directing oil back through the proper passages through the throttles into the sequence valve. Moving the handle upwardly will connect passages inside the main body and core plates to by-pass the feed throttles, feed pulse, and sequence valves and furnish oil directly to the top of the feed piston, resulting in retraction. Of course, when the handle is released, it will again return to the central position directing oil back through the upper passages, through the throttles, sequence, and impulse valves. The selector handle may be used to advance or retract the feed box at any time during the cycle regardless of the position of the feed cycle selector knob which can be set on either constant or impulse type of operation. With the handle 53 in the "off" position, moving the selector handle to retract or rapid feed position a number of times in succession and holding it in these positions for a few seconds, will allow air to be bled from the feed box by connecting the pressure and exhaust lines together through the cores and passages in the feed box body.

The handle 53 which is connected to the shaft 153 passing through the hollow center of the shaft 162 is connected to the valve spindle 155. Moving the lever approximately 45° counter-clockwise to the "off" position revolves the valve and thereby connects the pressure and the exhaust sides of the main feed cylinder together, creating a short circuit of oil in the feed cylinder and stopping the feed. In this condition the annular dial 38 can be rotated in either direction by means of the hand wheel 39 or the hand compensation knob 41, since pressure on either side of the feed cylinder is equalized. The handle 53 has to be turned clockwise to the "on" position before the box will feed.

Figure 3:
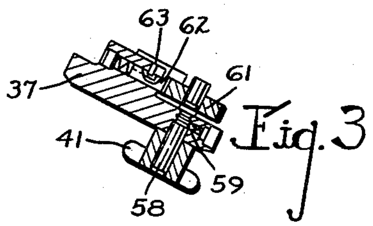
FIG. 3 is a sectional view of the invention taken on the line III—III of FIG. 1.

The knob 41 is attached to a splined shaft 58 which has a ratchet wheel or gear 61 attached to it. The knob accomplishes three things: first, it transmits the power from the feed piston through the hollow shaft 76 on the annular dial 38 to the hub 37 and the shaft 55. Secondly, it can be used for compensation, if desired, or it can be used in a situation where automatic compensation is not to be provided. Thirdly, it can be used for a vernier feed. The knob and its shaft has two positions and it is held in either position by the ball detent 51, as is shown in FIG. 3. With the knob in its innermost position the spline engages the gear 73 which is fastened to the hub of the annular dial 38. This provides positive power transmission between the feed piston and the gear 88. In the other position of the knob and shaft the detent finger 62 prevents the shaft 58 from turning so that power is not transmitted. However, the knob can be turned manually in small definite increments. When the knob is turned manually, the hand wheel will be advanced or retracted relative to the dial which will remain stationary. If the handle 53 is turned to the "off" position while one turns the knob 41, the dial will be advanced or retracted relative to the hand wheel or to the hub 37. This latter method provides a means of manual compensation, while the first method provides a vernier handwheel feed. The teeth on the ratchet or gear 61 are selected so that each movement from one tooth to another equals one ten-thousandth of wheel feed movement.

The pilot valve 213 which is used for impulse type of feed is located on the left hand side and to the rear in the feed box body. Alternate sides of the valve are piped to pilot "in" and "out" oil. When the knob 43 is turned to "constant," the feed oil from the sequence valve is directed around the impulse pilot valve directly to the feed piston, irrespective of the fact that the pilot valve is moving up and down with each reversal of the table. With the knob 43 turned to "impulse" feed, oil from the sqequence valve cannot go through the valve 101 and so therefore must go through the pilot valve 213. As the table starts in to move the wheel into the work, pilot "in" oil is directed to the bottom end of the pilot valve at the port 216, and the opposite end of this valve is open to exhaust through the port 217. The pilot valve plunger starts its travel. As the plunger travels, it opens the upper band of the cylinder to the lower band of the cylinder thereby allowing pressure oil into the feed cylinder to provide feed until the plunger has completed its stroke, at which time it cuts off pressure oil and stops feed. When the table reverses, the valve plunger moves in the opposite direction under the pressure of pilot "out" oil, thus repeating the impulse to the feed cylinder. Therefore, when the feed box is set for impulse feed, feed will occur at the time of every reversal of the table. With pressure oil directed to the bottom of the piston 84, the rack teeth on its side will engage the gear 82 on the shaft 76. This hollow shaft is, of course, fastened to the annular dial which also has the feed cam 71 fastened to it. The annular dial also has the dress knob, gear, pin, and lock as well as the final cam 137. Therefore, these all revolve with the gear. Since the pinion or spline shaft 58 is meshed with the gear 73 and is held by the detent finger 62 on the hand wheel or hub 37, the hand wheel is revolved also. The hand wheel or hub 37 is keyed to the shaft 55 carrying the sun gear and causing it to revolve. Revolving the sun gear causes the planet gears 86 to revolve and walk on the internal gear 87 which is stationary. The axis of the planet gears are fixed on the driven gear 88 so that, as the planet gears revolve along the sun gear, they drive the gear 88 causing it to revolve on its bearing and to cause feeding of the machine.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

The invention having been thus described, what is claimed as new and desired to secure by Letters Patent is:

1. A feed mechanism for a grinding machine, comprising a shaft, a main cylinder having a piston adapted to be connected to the shaft for the rotation thereof, a drum member connected to the shaft independently of the main cylinder for the rotation thereof, a friction band lying adjacent the drum member, a compensation means connected to the band for causing it to contact and rotate the drum member, and means for adjusting the amount of rotation of the drum member.

2. A feed mechanism for a grinding machine, comprising a shaft, a main hydraulic cylinder having a piston adapted to be connected to the shaft for the rotation thereof, a drum member having an external cylindrical surface connected to the shaft independently of the main cylinder for the rotation thereof, a friction band consisting of a split ring surrounding the said surface of the drum member, a compensation actuator connected to the band for causing it to contact and rotate the drum member, and means for adjusting the amount of rotation of the drum member.

3. A feed mechanism for a grinding machine, comprising a shaft, a main hydraulic cylinder having a piston adapted to be connected to the shaft for the rotation thereof, a drum member connected to the shaft independently of the main cylinder for the rotation thereof, a split ring lying adjacent the drum member, a compensation actuator connected to one end of the ring for causing it to contact and rotate the drum member, and means for adjusting the amount of rotation of the drum member.

4. A feed mechanism for a grinding machine, comprising a shaft, a main hydraulic cylinder having a piston adapted to be connected to the shaft for the rotation thereof, a drum member connected to the shaft for the rotation thereof, a friction band lying adjacent the drum member, a hydraulic linear actuator having a reciprocable rod connected at one end to the band for causing it to contact and rotate the drum member, and an adjustable stop located adjacent the other end of the rod for limiting the stroke of the rod and the amount of rotation of the drum member.

5. A feed mechanism for a grinding machine, comprising a main body having a front and a back, a shaft rotatably supported in the body and extending from both front and back thereof, a main hydraulic cylinder lying in a bore in the body having a piston adapted to be connected to the front end of the shaft for the rotation thereof, a drum member connected to the back end of the shaft externally of the body for the rotation thereof, a friction band lying adjacent the drum member, a compensation actuator connected to the band for causing it to contact and rotate the drum member, and means operative from the front of the body for adjusting the amount of rotation of the drum member.

6. A feed mechanism for a grinding machine, comprising a shaft, a main hydraulic cylinder having a piston adapted to be connected to the shaft for the rotation thereof, a drum member connected to the shaft for the rotation thereof, a friction band lying adjacent the drum member, a compensation actuator connected to the band for causing it to contact and rotate the drum member, and means for adjusting the amount of rotation of the drum member, the said means including a shaft extending through the body, a cam mounted on the end of the shaft which is on the same side of the body as the cylinder, and a rocker arm pivotally attached to the body, the rocker arm having one end contacted by the cam and the other positioned to limit the action of the actuator.

7. A feed mechanism for a grinding machine, comprising a shaft, a main hydraulic cylinder having a piston adapted to be connected to the shaft for the rotation thereof, a drum member having an external cylindrical surface connected to the shaft independently of the main cylinder for the rotation thereof, a split ring surrounding the said surface of the drum member, a compensation actuator connected to one end of the ring for causing it to contact and rotate the drum member, and means for adjusting the amount of rotation of the drum member.

8. A feed mechanism for a grinding machine, comprising a shaft, a main hydraulic cylinder having a piston adapted to be connected to the shaft for the rotation thereof, a drum member connected to the shaft for the rotation thereof, a friction band lying adjacent the drum member, a hydraulic linear actuator having a reciprocable rod connected at one end to the band for causing it to contact and rotate the drum member, and an adjustable stop located adjacent the other end of the rod for limiting the stroke of the rod and the amount of rotation of the drum member, the said stop including a shaft extending through the body, a cam mounted on the end of the shaft which is on the same side of the body as the compensation cylinder, and a rocker arm pivotally attached to the body, the rocker arm having one end contacted by the cam and the other positioned to limit the action of the rod.

9. A feed mechanism for a grinding machine, comprising a main body having a front and a back, a shaft rotatably supported in the body and extending from both front and back thereof, a main hydraulic cylinder lying in a bore in the body having a piston adapted to be connected to the front end of the shaft for the rotation thereof, a drum member having an external cylindrical surface connected independently of the cylinder to the back end of the shaft externally of the body for the rotation thereof, a split ring surrounding the said surface of the drum member, a compensation actuator connected to one end of the ring for causing it to contact and rotate the drum member, and means operative from the front of the body for adjusting the amount of rotation of the drum member.

10. A feed mechanism for a grinding machine, comprising a main body having a front and a back, a shaft rotatably supported in the body and extending from both front and back thereof, a main hydraulic cylinder lying in a bore in the body having a piston adapted to be connected to the front end of the shaft for the rotation thereof, a drum member connected to the back end of the shaft exteriorly of the body for the rotation thereof, a friction band lying adjacent the drum member, a hydraulic linear actuator having a reciprocable rod connected at one end to the band for causing it to contact and rotate the drum member, and means operative from the front of the body and consisting of an adjustable stop located adjacent the other end of the rod for limiting the stroke of the rod and the amount of rotation of the drum member, the said stop including a shaft extending through the body, a cam mounted on the end of the shaft which is on the same side of the body as the actuator, and a rocker arm pivotally attached to the body, the rocker arm having one end contacted by the cam and the other positioned to limit the action of the actuator.

11. A feed mechanism for a grinding machine, comprising a main body having a front and a back, a shaft rotatably supported in the body and extending from both front and back thereof, a main hydraulic cylinder lying in a bore in the body having a piston adapted to be connected to the front end of the shaft for the rotation thereof, a drum member having an external cylindrical surface connected to the back end of the shaft exteriorly of the body for the rotation thereof, a split ring surrounding the said surface of the drum member, a hydraulic linear actuator having a reciprocable rod connected at one end to the ring for causing it to contact and rotate the drum member, and an adjustable stop located adjacent the other end of the rod operative from the front of the body for limiting the stroke of the rod and the amount of rotation of the drum member, the said stop including a shaft extending through the body, a cam mounted on the end of the shaft which is on the same side of the body as the actuator, and a rocker arm pivotally attached to the body, the rocker arm having one end contacted by the cam and the other positioned to limit the action of the actuator.

12. A feed mechanism for a grinding machine, comprising a main body having a front and a back, a shaft rotatably supported in the body and extending from both front and back thereof, a main hydraulic cylinder lying in a bore in the body having a piston adapted to be connected to the front end of the shaft for the rotation thereof, a drum member having an external cylindrical surface connected to the back end of the shaft exteriorly of the body for the rotation thereof, a friction band consisting of a split ring surrounding the said surface of the drum member, a compensation actuator connected to the band for causing it to contact and rotate the drum member, and means operative from the front end of the body for adjusting the amount of rotation of the drum member.

13. A feed mechanism for a grinding machine, comprising a shaft, a main hydraulic cylinder having a piston adapted to be connected to the shaft for the rotation thereof, a drum member having an external cylindrical surface connected to the shaft for the rotation thereof, a friction band consisting of a split ring surrounding the said surface of the drum member, a compensation actuator connected to the band for causing it to contact and rotate the drum member, and means for adjusting the amount of rotation of the drum member, the said means including a shaft extending through the body, a cam mounted on the end of the shaft which is on the same side of the body as the compensation actuator, and a rocker arm pivotally attached to the body, the rocker arm having one end contacted by the cam and the other positioned to limit the action of the actuator.

14. A feed mechanism for a grinding machine, comprising a shaft, a main hydraulic cylinder having a piston adapted to be connected to the shaft for the rotation thereof, a drum member connected to the shaft for the rotation thereof, a split ring lying adjacent the drum member, a hydraulic linear actuator having a reciprocable rod connected at one end to one end of the ring for causing it to contact and rotate the drum member, and an adjustable stop located adjacent the other end of the rod for limiting the stroke of the rod and the amount of rotation of the drum member.

15. A feed mechanism for a grinding machine, comprising a main body having a front and a back, a shaft rotatably supported in the body and extending from both front and back thereof, a main hydraulic cylinder lying in a bore in the body having a piston adapted to be connected to the front end of the shaft for the rotation thereof, a drum member connected to the back end of the shaft exteriorly of the body for the rotation thereof, a friction band lying adjacent the drum member, a hydraulic linear actuator having a reciprocable rod connected at one end to the band for causing it to contact and rotate the drum member, and an adjustable stop located adjacent the other end of the rod operative from the front of the body for adjusting the amount of rotation of the drum member.

16. A feed mechanism for a grinding machine, comprising a feed shaft, a main hydraulic cylinder having a piston connected to rotate the shaft, a source of fluid pressure connected to the cylinder, a sequence valve for determining the flow of fluid to the cylinder, means for actuating the valve to produce an automatic grinding cycle, a compensation cylinder having a piston which is connected to the feed shaft for producing incremental rotation thereof, a selector valve permitting selectively a manual rapid in-feed or retraction at any time during the grinding cycle.

17. A feed mechanism for a grinding machine having a reciprocating wheel, comprising a feed shaft, a main hydraulic cylinder having a piston connected to rotate the shaft, a source of fluid pressure connected to the cylinder, a sequence valve for determining the flow of fluid to the cylinder, means for actuating the valve to produce an automatic grinding cycle, a compensation cylinder having a piston which is connected to the feed shaft for producing incremental rotation thereof, and means selectively permitting constant rotation of the feed shaft during the grinding cycle or rotation of the feed shaft only at the end of each reciprocation of the wheel.

18. A feed mechanism for a grinding machine having a reciprocating wheel, comprising a feed shaft, a main hydraulic cylinder having a piston connected to rotate the shaft, a source of fluid pressure connected to the cylinder, a sequence valve for determining the flow of fluid to the cylinder, means for actuating the valve to produce an automatic grinding cycle, a compensation cylinder having a piston which is connected to the feed shaft for producing incremental rotation thereof, a selector valve permitting selectively a manual rapid in-feed or retraction at any time during the grinding cycle, and means selectively permitting constant rotation of the feed shaft during the grinding cycle or rotation of the feed shaft only at the end of each reciprocation of the wheel.

19. A feed mechanism for a grinding machine having a reciprocating wheel, comprising a feed shaft, a main hydraulic cylinder having a piston connected to rotate the shaft, a source of fluid pressure connected to the cylinder, a sequence valve for determining the flow of fluid to the cylinder, means for actuating the valve to produce an automatic grinding cycle, a compensation actuator connected to the feed shaft for producing incremental rotation thereof, a selector valve permitting selectively a manual rapid in-feed or retraction at any time during the grinding cycle, and means selectively permitting constant rotation of the feed shaft during the grinding cycle or rotation of the feed shaft only at the end of each reciprocation of the wheel, a drum member having an external cylindrical surface connected to the shaft for the rotation thereof, a friction band consisting of a split ring surrounding the said surface of the drum member, the compensation actuator being connected to the band for causing it to contact and rotate the drum member, and means for adjusting the amount of rotation of the drum member.

20. A feed mechanism for a grinding machine, comprising a main body having a front and a back, a shaft rotatably supported in the body and extending from both front and back thereof, a main hydraulic cylinder lying in a bore in the body having a piston adapted to be connected to the front end of the shaft for the rotation thereof, a drum member connected to the back end of the shaft exteriorly of the body for the rotation thereof, a one-way clutch lying adjacent the drum member, a hydraulic linear actuator having a reciprocable rod connected at one end to the clutch for causing it to contact and rotate the drum member, and means operative from the front of the body and consisting of an adjustable stop located adjacent the other end of the rod for limiting the stroke of the rod and the amount of rotation of the drum member, the said stop including a shaft extending through the body, a cam mounted on the end of the shaft which is on the same side of the body as the actuator, and a rocker arm pivotally attached to the body, the rocker arm having one end contacted by the cam and the other positioned to limit the action of the actuator.

21. A feed mechanism for a machine tool, comprising a shaft, a main hydraulic cylinder having a piston adapted to be connected to the shaft for the rotation thereof, a drum member having an external cylindrical surface connected to the shaft independently of the cylinder for the rotation thereof, a one-way clutch surrounding the said surface of the drum member, a compensation actuator connected to one end of the clutch for causing it to contact and rotate the drum member, and means for adjusting the amount of rotation of the drum member.

References Cited in the file of this patent

UNITED STATES PATENTS

| | | |
|---|---|---|
| 1,891,662 | Booth | Dec. 20, 1932 |
| 1,911,890 | Fraser | May 30, 1933 |
| 1,965,696 | Ferris et al. | July 10, 1934 |

FOREIGN PATENTS

| | | |
|---|---|---|
| 816,950 | Great Britain | July 22, 1959 |